United States Patent Office 2,996,355
Patented Aug. 15, 1961

2,996,355
PROCESS FOR THE MANUFACTURE OF SODIUM ALUMINUM FLUORIDES
Jonas Kamlet, New York, N.Y., assignor to Reynolds Metals Company, Richmond, Va., a corporation of Delaware
No Drawing. Filed Sept. 12, 1958, Ser. No. 760,533
8 Claims. (Cl. 23—88)

This invention relates to a process for the manufacture of sodium aluminum fluorides. More particularly, this invention relates to a process for the manufacture of cryolite ($Na_3AlF_6$ or $3NaF \cdot AlF_3$, with 75 mole-percent of NaF and 25 mole-percent of $AlF_3$), of chiolite ($Na_5Al_3F_{14}$ or $5NaF \cdot 3AlF_3$, with 62.5 mole-percent of NaF and 37.5 mole-percent of $AlF_3$) and of sodium aluminum fluorides intermediate in composition between that of cryolite and that of chiolite. It has for its purpose to provide an efficient and economical process for the manufacture of sodium aluminum fluorides particularly low in silica content, suitable for use in the electrolytic manufacture of aluminum metal.

The electrolytes employed in the Hall-Heroult aluminum process are molten mixtures of sodium fluoride and aluminum fluoride intermediate in composition between that of cryolite (75 mole-percent of NaF) (M.P. 1000° C.) and the eutectic (53.5 mole-percent of NaF) (M.P. 685° C.). Cryolite, chiolite and sodium aluminum fluorides of intermediate compositions are therefore used in considerable quantities for the preparation and periodic replenishment of such molten electrolyte baths in the commercial manufacture of aluminum metal. For this use, the sodium aluminum fluorides must be particularly low in silica content, preferably below 0.3% $SiO_2$, since the accumulation of silica in the electrolyte bath has a deleterious effect on the aluminum metal produced.

This invention relates to a process for the manufacture of cryolite, chiolite and intermediate sodium aluminum fluorides employing as (a) A source of the sodium ion: the cheap and readily available neutral and alkaline sodium compounds (such as sodium chloride, sodium sulfate, sodium fluoride, sodium sulfate-sodium fluoride double salt, sodium nitrate, sodium hydroxide, sodium carbonate and sodium bicarbonate);

(b) A source of the aluminum ion: aluminum oxide or aluminum hydroxide, such as are obtained in the well-known alkaline and acid processes for the recovery of alumina from bauxites, clays and aluminiferous ores; and (c) A source of the fluorine ion: aqueous solutions of hydrofluoric acid containing fluosilicic acid—$H_2SiF_6$.

Hydrofluoric acid is usually prepared by the reaction of calcium fluoride-containing minerals (such as fluorspar, fluorite, Derbyshire spar) with sulfuric acid. The silica present in such minerals is partially evolved as $SiF_4$, and this condenses with the HF, when the latter is dissolved in water, to form hydrofluoric acid solutions containing fluosilicic acid—$H_2SiF_6$. Although acid-grade fluorspar (containing a minimum of 95% $CaF_2$) is usually preferred for the manufacture of hydrofluoric acid, it is the purpose of this invention to permit much poorer grades of fluorspar to be used in the preparation of the HF employed in the manufacture of sodium aluminum fluorides. Thus, it is feasible to use fluorspars containing as little as 60% $CaF_2$. It is desirable to use fluorspars containing as little $CaCO_3$ as possible since this component consumes sulfuric acid without corresponding HF formation. However, a high silica fluorspar, yielding a hydrofluoric acid solution high in fluosilicic acid content, may be used in the process of this invention with good results.

Another excellent source for the HF solutions required in the process of this invention is the residual HF gas from the process now employed by the aluminum industry to manufacture aluminum flduoride. Hydrogen fluoride is generated in stills by the reaction of fluorspar with sulfuric acid, and is passed at advanced temperatures over alumina in heated rotary kilns. A certain portion of the HF (about 20% of the total) passes unreacted through the kilns, carrying with it most of the $SiF_4$ formed in the fluorspar stills. On absorbing this HF gas containing $SiF_4$ in water, a hydrofluoric acid solution containing considerable amounts of fluosilicic acid is obtained. This solution is ideally suited for the process of this invention.

Similarly, the HF and $SiF_4$ from the den gases generated in the acidulation of phosphate rock, when absorbed in water, yield hydrofluoric acid solutions containing fluosilicic acid, which are suitable for use in the process of this invention. Other sources of HF suitable for use in this process are the anode off-gases from the electrolytic manufacture of aluminum (containing HF and $SiF_4$ in addition to $CO_2$, CO and smaller amounts of $CF_4$, $SO_2$, moisture and hydrocarbons) which, when dissolved in water, give aqueous solutions of hydrofluoric acid containing fluosilicic acid.

In general, any hydrofluoric acid solution containing fluosilicic acid, made in any manner and from any source whatever, is suitable for use in the process of this invention.

In order to obtain cryolite, chiolite or other sodium aluminum fluorides from such hydrofluoric acid solutions containing fluosilicic acid, it is essential that these solutions be efficiently and almost completely freed of silicon compounds. To meet the maximum permissible silica content of 0.3% in cryolite and chiolite, it is as a rule necessary to employ hydrofluoric acid solutions with a fluorine-silica ratio in excess of 250:1 (the $H_2SiF_6$ content being calculated on the basis of its $SiO_2$ equivalent).

Numerous processes have been described in the prior art for the desilication of hydrofluoric acid solutions containing fluosilicic acid. Processes involving distillation are described by the I. G. Farbenindustrie German Patents 558,132 (1930), 580,633 (1933), 581,714 (1933); U.S. Patents 1,903,408 (1933), 1,851,652 (1932); French Patents 708,139 (1930), 741,966 (1933); by Duzzi in Italian Patent 465,066 (1951), by the Verein für Chemische und Metallurgische Produktion in British Patent 289,383 (1927), by Nikolajev and Ivanov in the Zhur. Khem. Prom. 13, 606 (1930), and by others. Processes involving prior purification of the calcium fluoride mineral are described by Preisman in U.S. Patent 2,296,118 (1943), and by Jones in British Patent 620,745 (1949). The intermediate formation of fluosulfonic acid as a means for the desilication of hydrofluoric acid is described by Hopkins, Stephenson and Watson in U.S. Patent 2,456,509 (1948), and by Mitchell and Mackay in U.S. Patent 2,702,233 (1955).

Fluosilicic acid may be separated from hydrofluoric acid solutions by the addition of alkali metal compounds, which cause the precipitation of the corresponding alkali metal fluosilicates. This has been described by Howard, British Patent 186,606 (1922), German Patent 442,827 (1927), by Chemische Werke Albert u. Hesse, French Patent 698,921 (1930), by Yatlov and Ryss in Russian Patent 30,268 (1933), and in Russian Patent 36,392 (1934), by Muller in Yugoslav Patent 6917 (1930), by Soll in German Patent 580,062 (1933); by Buchner in British Patents 234,852 and 255,464 (1924), and in U.S. Patent 1,701,225 (1929); by Bachman in Austrian Patent 117,010 (1930), by Catlin in U.S. Patent 1,293,703

(1919), by Winter in U.S. Patent 2,588,786 (1952), and by others.

However, it has heretofore not been possible to obtain adequate desilication of hydrofluoric acid solutions by the addition of alkali metal compounds. The addition of potassium compounds in stoichiometric excess to an HF solution containing $H_2SiF_6$ will cause the precipitation of insoluble $K_2SiF_6$, but sufficient amounts of the potassium compounds are left behind in the HF solution to cause the cryolite and chiolite prepared therefrom to be excessively contaminated with the potassium analogues of these sodium aluminum fluorides. These potassium analogues are undesirable contaminants of the sodium aluminum fluorides employed as electrolyte additives in the aluminum process.

The addition of sodium compounds to aqueous HF solutions containing $H_2SiF_6$ will cause partial desilication of these solutions, by precipitation of $Na_2SiF_6$. However, sodium silicofluoride is moderately soluble in aqueous solutions of hydrofluoric acid (1.43 gms. in 100 gms. of a 26.5% HF solution at 50° C.) more so than in water (1.29 gms. in 100 gms. of water at 50° C.) (Nikolaev et al., Journ. Appl. Chem. (USSR) 9, 1183–90 (1936). Thus, it has never heretofore been possible to effect adequate desilication of HF solutions containing $H_2SiF_6$, by the addition of sodium compounds, to obtain fluorine:silica ratios in excess of 250:1 in said HF solutions, this being the minimum degree of desilication necessary if said HF solutions are to be used in the manufacture of cryolite, chiolite and sodium aluminum fluorides of intermediate compositions. The addition of sodium compounds (such as sodium chloride, caustic soda, etc.) to aqueous solutions of HF containing $H_2SiF_6$, as heretofore described in the prior art, gives partial desilication of the HF solutions, but never to an adequate degree, and never to the extent required to obtain solutions with $F:SiO_2$ ratios in excess of 250:1.

The basis of my invention is a specific method for the desilication of hydrofluoric acid solutions containing fluosilicic acid, by the addition of sodium compounds and the precipitation and separation of sodium silicofluoride therefrom, said specific desilication process being thereafter integrable with the utilization of the desilicated hydrofluoric acid solutions for the manufacture of cryolite, chiolite and intermediate compositions sodium aluminum fluorides. My invention will best be understood by the description of the various steps thereof contained herein.

Theoretically, two mole-equivalents of a sodium compound are required to react with each mole of the fluosilicic acid contained in hydrofluoric acid solutions to form the sodium silicofluoride. I have found that if two mole-equivalents of a sodium compound are added per mole of $H_2SiF_6$ in the HF solution, there will be some precipitation of $Na_2SiF_6$. However, because of the moderately high solubility of $Na_2SiF_6$ in the HF solutions (described above), the degree of desilication by this precipitation of $Na_2SiF_6$ is never adequate to yield a filtrate with a $F:SiO_2$ ratio in excess of 250:1 (required for cryolite and chiolite synthesis).

I have found that if an excess of the sodium compound is added, the common-ion effect of the excess sodium ion left in the solution will serve in a very marked manner to depress the solubility of the $Na_2SiF_6$ in the HF solution and cause a much more complete precipitation of the $Na_2SiF_6$ to occur.

The amount of excess sodium compound added is, however, very critical for this "salting out" of the $Na_2SiF_6$ from HF solutions. If three mole-equivalents of sodium compound are added per mole of $H_2SiF_6$ in the HF solution, a greatly increased desilication (by precipitation of $Na_2SiF_6$) is effected. Maximum desilication is effected by the addition of four mole-equivalents per mole of $H_2SiF_6$ contained in the HF solution.

However, if more than four mole-equivalents of the sodium compound are added per mole of $H_2SiF_6$, this common-ion effect in salting out the $Na_2SiF_6$ reverses itself. This is a most unforeseen and unexpected phenomenon. When more than four mole-equivalents of sodium compound are added to the HF solution containing $H_2SiF_6$, a precipitate of poorly soluble sodium fluoride and sodium bifluoride will form before the $Na_2SiF_6$ starts to precipitate. This precipitation of NaF and $NaHF_2$ will remove the excess sodium ion from solution, and this will thus obviate the agent which effects the common-ion salting out of the $Na_2SiF_6$.

Thus, using an HF solution assaying 37.0% HF and 7.84% $H_2SiF_6$, the following results were obtained in the desilication. In each case, the sodium compound was added as a saturated aqueous solution. The reaction mixture was allowed to stand at room temperature for 24 hours, and the precipitated $Na_2SiF_6$ was centrifuged or filtered off. The ratio of fluorine to silicon (calculated as $SiO_2$) in the filtrate was:

| Mole-equivalents of Sodium Compound per mole of $H_2SiF_6$ | Fluorine/Silica Ratio (by weight) in desilicated filtrate |
|---|---|
| None | 11:1 |
| NaOH: | |
| 2.0 | 68:1 |
| 3.0 | 258:1 |
| 4.0 | 512:1 |
| 5.0 | 388:1 |
| 6.0 | 226:1 |
| $Na_2CO_3$: | |
| 2.0 | 66:1 |
| 3.0 | 252:1 |
| 4.0 | 505:1 |
| 5.0 | 390:1 |
| 6.0 | 242:1 |
| NaCl: | |
| 2.0 | 60:1 |
| 3.0 | 260:1 |
| 4.0 | 511:1 |
| 5.0 | 355:1 |
| 6.0 | 238:1 |
| NaF: | |
| 2.0 | 48:1 |
| 3.0 | 250:1 |
| 4.0 | 448:1 |
| 5.0 | 302:1 |
| 6.0 | 220:1 |
| $Na_2SO_4$: | |
| 2.0 | 58:1 |
| 3.0 | 252:1 |
| 4.0 | 458:1 |
| 5.0 | 338:1 |
| 6.0 | 226:1 |
| $NaNO_3$: | |
| 2.0 | 60:1 |
| 3.0 | 261:1 |
| 4.0 | 459:1 |
| 5.0 | 340:1 |
| 6.0 | 220:1 |
| Double Salt ($Na_2SO_4.NaF$): | |
| 2.0 | 44:1 |
| 3.0 | 260:1 |
| 4.0 | 426:1 |
| 5.0 | 337:1 |
| 6.0 | 230:1 |

Sodium bicarbonate gives results substantially identical to those obtained with sodium carbonate.

For this desilication step, any desired sodium compound may be employed. The sodium compounds described above are preferred on the basis of their cost and availability.

The sodium compounds may be added to the HF solution containing $H_2SiF_6$ in the form of the solid compound, as an aqueous slurry or as an aqueous solution. I have found that when added in the solid form, these sodium compounds may occasionally effect a premature precipitation of NaF and $NaHF_2$ prior to the precipitation of the $Na_2SiF_6$. Thus, I prefer to add the sodium compound as a saturated or concentrated aqueous solution. However, this is by no means critical. The sodium compound may be added in any desired form—as a solid, as a slurry or as an aqueous solution.

When the highly soluble sodium compounds (such as NaOH, $Na_2CO_3$, NaCl, $Na_2SO_4$ and $NaNO_3$) are added as a concentrated or saturated aqueous solution, there is not too much dilution of the HF solution. However, in the case of the poorly soluble sodium compounds (NaF, NaHCO$_3$ and double salt), the use of concentrated or saturated aqueous solutions involves a dilution of the HF solution, with corresponding increase in the Na$_2$SiF$_6$ which remains behind dissolved in the HF filtrate. This dilution effect must be considered in the choice of sodium compound used in the desilication and the method of addition of said sodium compound.

Thus, it will be noted from the above table that maximum desilication of HF solutions containing H$_2$SiF$_6$ is obtained by the addition of from 3.0 to 5.0 mole-equivalents of sodium compound per mole of H$_2$SiF$_6$, and preferably 4.0 mole-equivalents of sodium compound per mole of H$_2$SiF$_6$. Between these limits, the desilicated HF solutions have the desired F:SiO$_2$ ratios in excess of 250:1. Below and above these critical limits, inadequate desilication is obtained.

An explanation of the nature and origin of the double salt (Na$_2$SO$_4$·NaF) referred to above may be appropriate at this point.

Many bauxite and bauxitic ores found throughout the world (such as the extensive deposits mined in Arkansas) contain small amounts of fluoride (probably bound as calcium fluoride) and sulfide (probably bound as iron pyrites). These elements find their way into the "red mud" (the desilication residue) of the well-known Bayer process for the recovery of alumina from bauxite. It is now common practice in many plants to recover alumina and soda values from this "red mud" residue by sintering the same with limestone and soda ash (the so-called "combination process" or "soda-lime sinter process") and leaching sodium aluminate from the sinter. During the calcination of the "red mud" in this process, the pyrites are probably oxidized to iron sulfates. The sulfate ion in the latter and the fluoride in the CaF$_2$ are solubilized by the soda in the kiln feed, and are dissolved out of the sinter with the sodium aluminate leach liquors. After alumina recovery from these leach liquors, the spent liquors are concentrated for recycling to the process. During this concentration, the sulfate and fluoride precipitates out as a double salt of composition Na$_2$SO$_4$·NaF, which is filtered off and recovered. About 13.5 to 14.0 lbs. of this double salt are recovered per ton of Arkansas bauxite ore processed.

At present, this double salt by-product has no industrial use and is largely being discarded. It is the purpose of this invention to provide a process whereby all of the alkali values of this double salt—Na$_2$SO$_4$·NaF—and all of the fluoride values are recovered and utilized in the manufacture of sodium aluminum fluorides low in silica content, suitable for use in the electrolyte bath of the aluminum process.

After precipitation of the Na$_2$SiF$_6$, and removal of the precipitate (e.g. by filtration, centrifuging, sedimentation and decantation, etc.), the desilicated solution of HF, containing the excess sodium compound dissolved therein, is now ideally suited for conversion to cryolite, chiolite or sodium aluminum fluorides of intermediate composition.

This conversion is effected by reacting the desilicated HF solution containing dissolved sodium compound with
(a) Aluminum oxide or aluminum hydroxide, and
(b) A further quantity of a sodium compound, the total quantity of aluminum oxide (or hydroxide) and sodium compound (initially present in the desilicated HF solution and added subsequently after the desilication) being sufficient to provide a reaction mixture containing the equivalent of from 62.5 to 75.0 mole-percent of NaF and 25.0 to 37.5 mole-percent of AlF$_3$.

The aluminum compound employed may be derived from any source whatever. It may, for instance, be calcined alumina from the Bayer process or the combination process. However, because of its greater reactivity, I prefer to use aluminum hydroxide, and preferably the washed, wet filter cake of aluminum hydroxide obtained from the seeding of sodium aluminate liquors, prior to the calcination to alumina.

The sodium compound employed may be the same as that used in the desilication, or it may be a different sodium compound. A considerable latitude in choice of reagents is permissible here. Ordinary salt (NaCl) is the most economical reagent for use in both steps. However, it may be found that other sodium compounds are preferable at different plant sites and under different conditions. Thus, because of the low solubility of the double salt, it may be found desirable to effect the desilication with NaCl, Na$_2$CO$_3$ or NaOH (so as to avoid excessive dilution of the HF solution), and to add the double salt (with the aluminum compound) in the required amounts, to the desilicated HF solutions.

I prefer to effect the reaction by digesting the reaction mixture of desilicated hydrofluoric acid, the added aluminum compound and the added sodium compound at 90° C. to 100° C. for one to two hours, with good agitation, and thereafter filtering off the sodium aluminum fluoride precipitate from the aqueous medium. The precipitate is washed with a little water, and is dried by the processes well known in the art. These conditions are by no means critical and may be varied over wide ranges and under different conditions. Excellent yields of the sodium aluminum fluorides are obtainable by this procedure.

The sodium compounds added (with the aluminum compound) to the desilicated HF solutions, may be added as solids, as aqueous slurries or as aqueous solutions. No advantage is derived by the addition of aqueous solutions in this case, as may be derived by the use of aqueous solutions in the desilication step.

The reaction of the desilicated HF solutions, the sodium compound and the aluminum compound may be effected over a wide range of temperatures (e.g. from below room temperature to the boiling point of the solutions at the ambient pressures), at sub-atmospheric, atmospheric or super-atmospheric pressures, and over a wide range of concentrations.

Best yields of the sodium aluminum fluorides are obtained if the reaction of the final solution from which these compounds are precipitated lies within pH 4.0 to pH 7.0. Somewhat lower yields are obtained if the reaction of the final solution lies below pH 4.0.

The use of the alkaline sodium compounds (e.g. NaOH, Na$_2$CO$_3$ or NaHCO$_3$) in the final step gives a reaction medium within a range of pH 4.0 to pH 7.0, by the reaction (for example):

$6HF + Al(OH)_3 + 3NaOH \rightarrow Na_3AlF_6 + 6H_2O$

The use of the neutral sodium salts (e.g. NaCl, NaF, NaNO$_3$, Na$_2$SO$_4$ or double salt) gives a reaction medium with a pH below 4.0, by the reaction (for example):

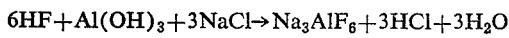

$6HF + Al(OH)_3 + 3NaCl \rightarrow Na_3AlF_6 + 3HCl + 3H_2O$

The sodium aluminum fluorides are somewhat more soluble in the dilute acid solutions formed than they are in neutral aqueous media, hence the somewhat lower yields. Thus, the economies resulting from the use of the cheaper sodium salts (e.g. NaCl, Na$_2$SO$_4$, double salt) must be weighed against the higher sodium aluminum fluoride yields obtained when the more expensive alkaline sodium compounds are used.

When the neutral sodium salts are employed, the filtrate from the sodium aluminum fluoride precipitation is a dilute acid solution (e.g. HCl when NaCl is used, H$_2$SO$_4$ when Na$_2$SO$_4$ or double salt is used, etc.). These dilute acid solutions may be used for the recovery of chemical values (e.g. by reaction with bauxite to obtain aluminum chloride, aluminum sulphate, etc.).

In employing the double salt, the amount of desilicated HF solution containing dissolved sodium compound and the amount of aluminum compound added should be calculated taking into account the fluoride ion introduced with the double salt (e.g. by the reaction $Na_2SO_4 \cdot NaF + Al(OH)_3 + 5HF \rightarrow Na_3AlF_6 + H_2SO_4 + 3H_2O$ in the manufacture of cryolite).

It is also obvious from the description of this process that the sodium compound and the aluminum compound may be added together in the form of a sodium aluminate solution, of any desired $Na_2O/Al_2O_3$ ratio. Such solutions are obtained in the well known Bayer process, in the combination process and in most "alkaline" processes for the recovery of alumina from ores. It is only essential that the proportions of the sodium ion (as the sodium aluminate plus the dissolved sodium compound in the desilicated HF solution), the aluminum ion in the sodium aluminate and the fluoride ion, in the reaction mixture correspond to the molar proportions required for the formation of cryolite, chiolite or sodium aluminates of intermediate compositions.

It is also obvious that two or more sodium compounds may be employed in the desilicated step, as well as in the preparation of the sodium aluminum fluorides. Any combination of one or more sodium compounds may be used in the desilication step and one or more of the same or other sodium compounds may be used in the preparation of the sodium aluminum fluorides.

The sodium silicofluoride obtained in the desilication step represents a valuable by-product of this process. It may be employed for further processing to fluorine chemicals, or in its present applications (e.g. for water treatment, as a laundry sour, in the ceramic industries, in the manufacture of glass, as an insecticide, in the metallurgical industries, etc.).

The following examples are given to define and to illustrate this invention, but in no way to limit it to reagents, proportions or conditions described therein. Obvious modifications will occur to any person skilled in the art.

*Example I*

A hydrofluoric acid solution containing 37.0% HF and 7.84% $H_2SiF_6$ (by weight), such as may be derived from any of the sources described above, is employed.

330 gms. of this HF solution (containing 6.1 moles of HF and 0.180 mole of $H_2SiF_6$) is mixed with a solution of 42.5 gms. NaCl (0.72 mole or four mole-equivalents per mole $H_2SiF_6$) in 120 cc. of water, and allowed to stand at room temperature for 24 hours. The precipitated $Na_2SiF_6$ is filtered off and blown free of solution on the filter with compressed air.

The filtrate (containing 6.0 moles of HF and 0.36 mole of dissolved NaCl) is now mixed with aluminum hydroxide filtercake (from the Bayer process) containing 78.0 gms. of $Al(OH)_3$ (1 mole) and with 154.5 gms. of NaCl (2.64 moles, i.e. sufficient to bring the total dissolved sodium salt in the reaction mixture to 3.00 moles) in 450 cc. of water. The reaction mixture is digested with agitation, at 90° to 100° C., at atmospheric pressure, for one to two hours. It is then cooled to room temperature and the precipitated cryolite is filtered off. The precipitate is washed free of acid with water and is then dried by heating at 700°–720° C. for 5 to 10 minutes.

There is thus obtained a yield of 189 gms. of cryolite ($Na_3AlF_6$) equivalent to 90% of theoretical. The cryolite assays to contain less than 0.07% $SiO_2$, less than 0.02% $Fe_2O_3$ and less than 0.07% moisture. It is ideally suited for use in the aluminum process as an electrolyte bath additive.

In the above example, by employing NaOH, $Na_2CO_3$, $NaNO_3$ and $Na_2SO_4$, in each case as saturated aqueous solutions, and in each case in the same mole-equivalency (i.e. 0.72 mole-equivalent for the desilication step and 2.64 mole-equivalents for the cryolite precipitation), the following yields of cryolite of equivalent purity are obtained:

| | Percent of theory |
|---|---|
| Using NaOH | 95 |
| Using $Na_2CO_3$ | 92 |
| Using $NaNO_3$ | 82 |
| Using $Na_2SO_4$ | 86 |

Because of the corrosive nature of the fluoride reagents, the reaction vessels, filters and other equipment in this process are made of lead, ceramics or rubber-lined materials of construction.

There is also obtained a by-product of 30 to 31 grams of sodium silicofluoride, from the desilication step.

*Example II*

390 gms. of the hydrofluoric acid solution containing 37.0% HF and 7.84% $H_2SiF_6$ (by weight) (containing 7.1 moles HF and 0.212 mole of $H_2SiF_6$) is mixed with a solution of 49.7 gms. of NaCl (0.85 mole or four mole-equivalents per mole $H_2SiF_6$) in 140 cc. of water, and allowed to stand at room temperature for 24 hours. The precipitated $Na_2SiF_6$ is filtered off and blown free of solution on the filter with compressed air.

The filtrate (containing 7.0 moles of HF and 0.424 mole of dissolved NaCl) is now mixed with aluminum hydroxide filtercake containing 117.0 gms. of $Al(OH)_3$ (1.5 moles) and with 121.5 gms. of NaCl (i.e. 2.076 mole to bring the total dissolved sodium salt in the reaction mixture to 2.50 moles) in 350 cc. of water. The reaction mixture is digested with agitation, at 90° to 100° C. at atmospheric pressure, for one to two hours. It is then cooled to room temperature and the precipitated chiolite is filtered off. The precipitate is washed free of acid with water and is then dried by heating at 650°–700° C. for 5 to 10 minutes.

There is thus obtained a yield of 195.5 gms. of chiolite ($5NaF \cdot 3AlF_3$), equivalent to 85% of theoretical. The chiolite assays to contain less than 0.10% $SiO_2$, less than 0.02% $Fe_2O_3$ and less than 0.08% moisture. It is suited for use in the aluminum process as an electrolyte bath additive.

In the above example, by employing NaOH, $Na_2CO_3$, $NaNO_3$ and $Na_2SO_4$, in each case as saturated aqueous solutions, and in each case in the same mole-equivalency (i.e. 0.85 mole-equivalent for the desilication step and 2.076 mole-equivalents for the chiolite precipitation), the following yields of chiolite of equivalent purity are obtained:

| | Percent of theory |
|---|---|
| Using NaOH | 90 |
| Using $Na_2CO_3$ | 91 |
| Using $NaNO_3$ | 80 |
| Using $Na_2SO_4$ | 85 |

By employing proportions of reagents intermediate between those used in Example I and those used in Example II, sodium aluminum fluorides of composition intermediate in molar concentration between chiolite ($5NaF \cdot 3AlF_3$) and cryolite ($3NaF \cdot AlF_3$) are obtained.

*Example III*

541 gms. of the hydrofluoric acid solution containing 37.0% HF and 7.84% $H_2SiF_6$ (by weight) (containing 10.0 moles HF and 0.295 mole $H_2SiF_6$) is mixed with a solution of 47.2 gms. of caustic soda (1.18 moles or four mole-equivalents per mole of $H_2SiF_6$) in 20 cc. of water, and allowed to stand at room temperature for 24 hours. The precipitated $Na_2SiF_6$ is filtered off and blown free of solution on the filter with compressed air.

The filtrate (containing 9.95 moles of fluoride ion and 0.59 mole-equivalent of sodium ion) is now mixed with aluminum hydroxide filtercake containing 244 gms. of $Al(OH)_3$ (3.12 moles) and with 367.5 gms. of sodium fluoride (8.75 moles). (This gives a total of 9.34 mole-equivalents of sodium ion, 3.12 mole-equivalents of aluminum ion and 18.70 mole-equivalents of fluoride ions, substantially equivalent to the 3NaF·AlF₃ ratio in cryolite.) The reaction mixture is digested with agitation for two hours at 95°–100° C., cooled to room temperature, filtered and the cryolite precipitate is washed on the filter with water until free of acid. The washed precipitate is dried at 650°–700° C. for ten minutes.

There is thus obtained a yield 588 gms. of cryolite, equivalent to 90% of theory.

*Example IV*

541 gms. of the hydrofluoric acid solution containing 37.0% HF and 7.84% H₂SiF₆ (by weight) is mixed with 69.0 gms. of NaCl (1.18 moles or four mole-equivalents per mole of H₂SiF₆) dissolved in 200 cc. of water. After standing at room temperature for 24 hours, the precipitated Na₂SiF₆ is centrifuged off.

The filtrate (containing 9.92 moles HF and 0.57 mole-equivalent of sodium ion) is now mixed with 152.0 gms. of aluminum hydroxide (1.95 moles) and 500.0 gms. of double salt (Na₂SO₄·NaF) (1.76 moles). This gives a total of 5.85 mole-equivalents of sodium ion, 1.95 mole-equivalents of aluminum ion and 11.68 mole-equivalents of fluoride ion in the reaction mixture, substantially equivalent to the molar proportions required for cryolite.) The reaction mixture is digested with agitation for two hours at 95°–100° C., cooled to room temperature and filtered. The filter cake is washed free of acid with cold water and is then dried.

The yield of cryolite is 535.5 grams, or 82% of theoretical.

*Example V*

541 gms. of a hydrofluoric acid solution containing 37.0% HF and 7.84% H₂SiF₆ (by weight) is mixed with 69.0 gms. of NaCl (1.18 moles or four mole-equivalents per mole of H₂SiF₆) dissolved in 200 cc. of water. After standing at room temperature for 24 hours, the precipitated Na₂SiF₆ is centrifuged off.

The filtrate (containing 9.92 moles HF and 0.57 mole-equivalent of sodium ion) is now mixed with 500 cc. of a solution of sodium aluminate containing the equivalent of 350.4 gms. of NaOH (4.38 mole-equivalents) and 168.4 gms. of Al₂O₃ (1.65 mole-equivalent) per liter. (This gives a total of 4.95 mole-equivalents of sodium ion, 1.65 mole-equivalents of aluminum ion and 9.92 mole-equivalents of fluoride ion, substantially equivalent to the molar proportions required for cryolite formation.) The mixture of the reagents causes an exothermic reaction. After the exothermic reaction has subsided, the reaction mixture is agitated, without heating, at room temperature for two hours, and is then filtered. The filtercake is washed with cold water and dried at 700° C. for five minutes.

The yield of cryolite is 329 grams, or 95% of the theoretical.

Having described my invention, what I claim and desire to protect by Letters Patent is:

1. A process for the manufacture of sodium aluminum fluorides of compositions consisting of from 62.5 to 75.0 mole-percent sodium fluoride and 25.0 to 37.5 mole-percent aluminum fluoride which consists of the steps of:

(a) reacting an aqueous hydrofluoric acid solution containing fluosilicic acid with a sodium compound chosen from the group consisting of sodium chloride and sodium sulfate in amounts equivalent to from 3.0 to 5.0 mole-equivalents of sodium compound per mole of fluosilicic acid in said hydrofluoric acid solution;

(b) separating the precipitated sodium silicofluoride from the desilicated hydrofluoric acid solution containing dissolved sodium compound;

(c) reacting the said desilicated hydrofluoric acid solution with a member of the group consisting of aluminum oxide and aluminum hydroxide, said aluminum compound being substantially free of silica, and an additional quantity of a sodium compound chosen from the group consisting of sodium chloride and sodium sulfate, the total amounts of sodium ion, aluminum ion and fluoride ion in said reaction mixture being equivalent to from 62.5 to 75.0 mole-percent sodium fluoride and from 25.0 to 37.5 mole-percent aluminum fluoride; and (d) separating the precipitated sodium aluminum fluoride from the reaction mixture.

2. The manufacture of cryolite by the process of claim 1.

3. The manufacture of chiolite by the process of claim 1.

4. The process of claim 1 in which four mole-equivalents of sodium compound are added per mole of fluosilicic acid in the hydrofluoric acid solution in step (a).

5. The process of claim 1 in which the sodium compound employed is sodium chloride.

6. The process of claim 1 in which the sodium compound employed is sodium sulfate.

7. A process for the manufacture of cryolite which comprises the steps of:

(a) reacting an aqueous solution of hydrofluoric acid containing fluosilicic acid with from 3.0 to 5.0 moles of sodium chloride per mole of fluosilicic acid in said hydrofluoric acid solution;

(b) separating the precipitated sodium silicofluoride from the desilicated hydrofluoric acid solution containing dissolved sodium chloride;

(c) reacting the said desilicated hydrofluoric acid solution with aluminum hydroxide substantially free of silica and an additional quantity of sodium chloride, the total amounts of sodium ion, aluminum ion and fluoride ion in said reaction mixture being equivalent to 75.0 mole-percent of sodium fluoride and 25.0 mole-percent of aluminum fluoride; and (d) separating the precipitated cryolite.

8. A process for the manufacture of chiolite which comprises the steps of:

(a) reacting an aqueous solution of hydrofluoric acid containing fluosilicic acid with from 3.0 to 5.0 moles of sodium chloride per mole of fluosilicic acid in said hydrofluoric acid solution;

(b) separating the precipitated sodium silicofluoride from the desilicated hydrofluoric acid solution containing dissolved sodium chloride;

(c) reacting the said desilicated hydrofluoric acid solution with aluminum hydroxide substantially free of silica and an additional quantity of sodium chloride, the total amounts of sodium ion, aluminum ion and fluorine ion in said reaction mixture being equivalent to 62.5 mole-percent of sodium fluoride and 37.5 mole-percent of aluminum fluoride; and (d) separating the precipitated chiolite.

References Cited in the file of this patent

UNITED STATES PATENTS

| | | |
|---|---|---|
| 1,664,348 | Buchner | Mar. 27, 1928 |
| 2,021,601 | Hilscher et al. | Nov. 19, 1935 |
| 2,058,075 | Gaither | Oct. 20, 1936 |
| 2,783,128 | Wendt | Feb. 26, 1957 |
| 2,865,709 | Horn et al. | Dec. 23, 1958 |

FOREIGN PATENTS

| | | |
|---|---|---|
| 49,862 | Norway | Dec. 14, 1931 |